US00RE40805E

(19) United States
(12) Reissued Patent
Whitley, II et al.

(10) Patent Number: US RE40,805 E
(45) Date of Reissued Patent: Jun. 30, 2009

(54) LIFT-UP CLEAT

(75) Inventors: Warwick M. Whitley, II, Burnet, TX (US); Bruce L. Reniger, Alto, MI (US); Elzie McKinney, Grand Rapids, MI (US); Trent A. Eekhoff, Grand Rapids, MI (US)

(73) Assignee: Attwood Corporation, Lowell, MI (US)

(21) Appl. No.: 11/171,653

(22) Filed: Jun. 29, 2005

Related U.S. Patent Documents

Reissue of:
(64) Patent No.: 6,588,355
Issued: Jul. 8, 2003
Appl. No.: 10/136,594
Filed: May 1, 2002

(51) Int. Cl.
*B63B 21/04* (2006.01)

(52) U.S. Cl. ..... 114/218
(58) Field of Classification Search ..... 114/218, 114/219; 405/106, 107, 108, 109, 110, 111
See application file for complete search history.

(56) References Cited

U.S. PATENT DOCUMENTS

| | | | |
|---|---|---|---|
| 1,299,529 | A | 4/1919 | Young |
| 1,365,830 | A | 1/1921 | Hurd |
| 1,817,775 | A | 8/1931 | Sipe |
| 1,871,668 | A | 8/1932 | Dawson |
| 2,281,279 | A | 4/1942 | Fox |
| 2,630,857 | A | 3/1953 | Cohen |
| 2,729,417 | A | 1/1956 | Maynard |
| 2,870,733 | A | 1/1959 | Winther |
| 3,126,859 | A | 3/1964 | Bigelow |
| 3,365,162 | A | 1/1968 | Davis |
| 3,507,477 | A | 4/1970 | Sandy et al. |
| 3,517,184 | A | 6/1970 | Norton et al. |
| 3,558,147 | A | 1/1971 | Johansson |
| 3,597,808 | A | 8/1971 | Johnson |
| 3,771,488 | A | 11/1973 | Ecke |
| 3,917,213 | A | 11/1975 | Poehlmann |

(Continued)

OTHER PUBLICATIONS

"Agreed Order," *Attwood Corporation* v. *Gem Products, Inc.*, Civil Action No. 04 C 7855, Aug. 30, 2005 (2 pages).

"Docket Entry Text," *Attwood Corporation* v. *Gem Products, Inc.*, Civil Action No. 04 C 7855, Aug. 30, 2005 (1 page).

(Continued)

*Primary Examiner*—Lars A Olson
(74) *Attorney, Agent, or Firm*—Brinks Hofer Gilson & Lione

(57) ABSTRACT

A lift-up cleat assembly includes a base member having an upper plate shaped to abut a mounting surface and at least one normally vertically oriented tube depending from the plate, wherein the tube has a hollow interior, and a retractable cleat member having an upper cleat-shaped head shaped to retain lines thereon, and at least one normally vertically oriented mounting post depending from the head, wherein the post is telescopingly received in the interior of the tube of the base member and is telescopingly movable along a given length of travel. The cleat assembly also includes a cup-shaped retainer located within the hollow interior of the tube base member and having a central portion fixed with respect to the mounting post of the cleat member and an elastically deformable skirt portion that flexibly abuts the tube of the base member, thereby providing infinitesimally small increments of adjustability of the post of the cleat member within the tube of the base member along the length of travel, and wherein the retainer is shaped to allow liquid located within the interior of the tube of the base member to drain therefrom.

115 Claims, 4 Drawing Sheets

U.S. PATENT DOCUMENTS

| | | | |
|---|---|---|---|
| 4,270,478 | A | 6/1981 | Kafka et al. |
| 4,354,445 | A | 10/1982 | Kafka et al. |
| 4,672,909 | A | 6/1987 | Sweetsir |
| 4,809,634 | A | 3/1989 | Czipri |
| 4,820,093 | A | 4/1989 | Hirakui et al. |
| 4,820,094 | A | 4/1989 | Hirakui et al. |
| 4,890,566 | A | 1/1990 | Morris |
| 4,895,471 | A | 1/1990 | Geltz et al. |
| 4,945,849 | A | 8/1990 | Morris et al. |
| 4,964,355 | A | 10/1990 | Milewski |
| 5,004,388 | A | 4/1991 | Harris |
| 5,069,570 | A | 12/1991 | Pryor et al. |
| 5,106,248 | A | 4/1992 | Harris |
| 5,301,627 | A | 4/1994 | Czipri |
| 5,438,944 | A | 8/1995 | Burke |
| 5,444,897 | A | 8/1995 | Gross |
| 5,535,694 | A | 7/1996 | Czipri |
| 5,598,803 | A | 2/1997 | Czipri |
| 5,983,820 | A | 11/1999 | Whitley |
| D430,099 | S | 8/2000 | Sobey |
| 6,125,779 | A | 10/2000 | Czipri |
| 6,151,756 | A | 11/2000 | Czipri |
| 6,183,178 | B1 | 2/2001 | Bateman |
| 6,234,101 | B1 | 5/2001 | Czipri |

OTHER PUBLICATIONS

"Attwood Corporation's Complaint for Patent Infringement and Jury Demand," *Attwood Corporation* v. *Accon Marine, L.L.C.*, Civil Action No. 07C 2029, Apr. 12, 2007 (14 pages).

"Notice of Claims Involving Patents," *Attwood Corporation* v. *Accon Marine L.L.C.,* Civil Action No. 07C 2029, Apr. 12, 2007 ( 2 pages).

"Notification of Affiliates—Disclosure Statement," *Attwood Corporation* v. *Accon Marine, L.L.C.*, Civil Action No. 07C 2029, Apr. 12, 2007 (1 page).

"Summons in a Civil Case," *Attwood Corporation* v. *Accon Marine, L.L.C.*, Civil Action No. 07C 2029, Apr. 12, 2007 (1 page).

"Civil Cover Sheet," *Attwood Corporation* v. *Accon Marine, L.L.C.*, Civil Action No. 07C 2029, Apr. 12, 2007 (2 pages).

"ABI Lift–Up Cleat" brochure by A & B Industries Incorporated of Petaluma, California, dated at least as early as Mar. 1998 (1 page).

"Flush Mounted Pop–Up Cleat" Brochure by Accon Marine, Inc. of Clearwater, Florida, dated at least as early as Mar. 1998 (4 pages).

"Stainless Steel Flush Cleat" brochure by Attwood Corporation of Lowell, Michigan, dated at least as early as 1998.

Osculati brochure dated at least as early as 1993 (3 pages).

Photographs of ABI Lift–up Cleat by A & B Industries Incorporated of Petaluma, California, dated at least as early as Mar. 1998.

U.S. Trademark Registration No. 1,937,562 on "Marine Fitting," registered Nov. 21, 1995 in the name of Accon, Inc., of Clearwater, Florida.

Accon Trademark Search Report.

"Plaintiff's Complaint for Patent Infringement and Jury Demand," *Attwood Corporation* v. *Gem Products Inc.*, Civil Action No. 04 C 7855, Dec. 6, 2004 (14 pages).

"Agreed Motion for Extension of Time to Answer or Otherwise Plead," *Attwood Corporation* v. *Gem Products, Inc.*, Civil Action No. 04 C 7855, Feb. 22, 2005, ( 4 pages).

"Defendant's Answer to Plaintiff's Complaint for Patent Infringement and Jury Demand and Counterclaims," *Attwood Corporation* v. *Gem Products, Inc.*, Civil Action No. 04 C 7855, Mar. 28, 2005 (8 pages).

"Docket Entry Text," *Attwood Corporation* v. *Accon Marine, L.L.C.,*Civil Action No. 07C 2029, Jul. 10, 2007 (1 page).

LIFT-UP CLEAT

Matter enclosed in heavy brackets [ ] appears in the original patent but forms no part of this reissue specification; matter printed in italics indicates the additions made by reissue.

BACKGROUND OF THE INVENTION

The present invention relates to cleats for recreational boats and the like, and in particular to a retractable cleat which incorporates a retainer that allows for infinitesimal adjustment of the retractable cleat from a base member while simultaneously allowing liquids collected within the base member to drain therethrough.

Retractable cleats are widely used within recreational boats for securing mooring lines and the like thereto. These retractable cleats typically include a base member, and a retractable cleat member that is telescopingly received within the interior of the base.

Heretofore, retractable cleats have generally been constructed such that water seeping into the base member is trapped therein, thereby resulting in corrosion and degradation to the base member as well as the retractable cleat received therein. The corrosion of the base members and retractable cleat often result in an unattractive overall appearance, and can hinder proper operation of the retractable cleat itself. In addition, retractable cleats have generally been constructed for adjustment between finite positions that typically include only the fully retracted and fully extended positions. This limited adjustability requires the cleat to be fully extended regardless of the amount of the cleat required to attach a mooring line thereto, thereby exposing the entire cleat member above the deck surface.

SUMMARY OF THE INVENTION

One aspect of the present invention is to provide a lift-up cleat assembly that includes a base member having an upper plate shaped to abut a mounting surface and at least one normally vertically oriented tube depending from the plate, wherein the tube has a hollow interior, and a retractable cleat member having an upper cleat-shaped head shaped to retain lines thereon, and at least one normally vertically oriented mounting post depending from the head, wherein the post is telescopingly received within the interior tube of the base member and is telescopingly movable along a given length of travel. The cleat assembly also includes a cup-shaped retainer located within the hollow interior of the tube of the base member and having a central portion fixed with respect to the mounting post of the cleat member and an elastically deformable skirt member that flexibly abuts the tube of the base member, thereby providing infinitesimally small increments of adjustability of the post of the cleat member within the tube of the base member along the length of travel. The retainer is shaped to allow liquid located within the interior of the tube of the base member to drain therefrom.

Another aspect of the present invention is to provide a lift-up cleat assembly that includes a one-piece base member having an upper plate defined by a top surface and a bottom surface, wherein the base member is shaped such that the bottom surface of the base member is adapted to flushly abut a mounting surface. The base member also includes at least one normally vertically oriented tube depending from the plate, wherein the tube has a hollow interior. The base member further includes a recess extending into the top surface. The lift-up cleat assembly also includes a retractable cleat member having an upper cleat-shaped head shaped to retain lines therein, and at least one normally vertically oriented mounting post depending from the head, wherein the post is telescopingly received in the interior of the tube of the base member, and wherein the head includes an upper surface that is substantially flush with the upper surface of the base member when the cleat member is in a retracted position. The cleat assembly further includes a fastener coupled with the tube of the base member and adapted to abut a bottom surface of the mounting surface, thereby retaining the base member to the mounting surface.

The cup-shaped retainer located within the interior of the tube of the base member allows for infinitesimally small increments of adjustability of the retractable cleat member within the base member, thereby allowing for precise adjustment of the cleat member depending on the required use, such as the size of the mooring lines utilized, etc. The shape of the retainer allows for complete drainage of the interior of the tube of the base member, thereby reducing the possible corrosion, discoloration and blemishing of the base member, retractable cleat and other components of the retractable cleat apparatus that may hinder operation thereof. Further, the one-piece base member and fastener coupled with the tube of the base member reduces the corrosion associated with multiple piece base members, as well as reduces the deterioration of the mounting surface such as a boat deck normally associated with mounting a cleat assembly to a deck surface via hardware such as screws that extend into the boat deck surface.

These and other features, advantages and objects of the present invention will be further understood and appreciated by those skilled in the art by reference to the following specification, claims and appended drawings.

DETAILED DESCRIPTION OF THE PREFERRED EMBODIMENT

Figure 1:
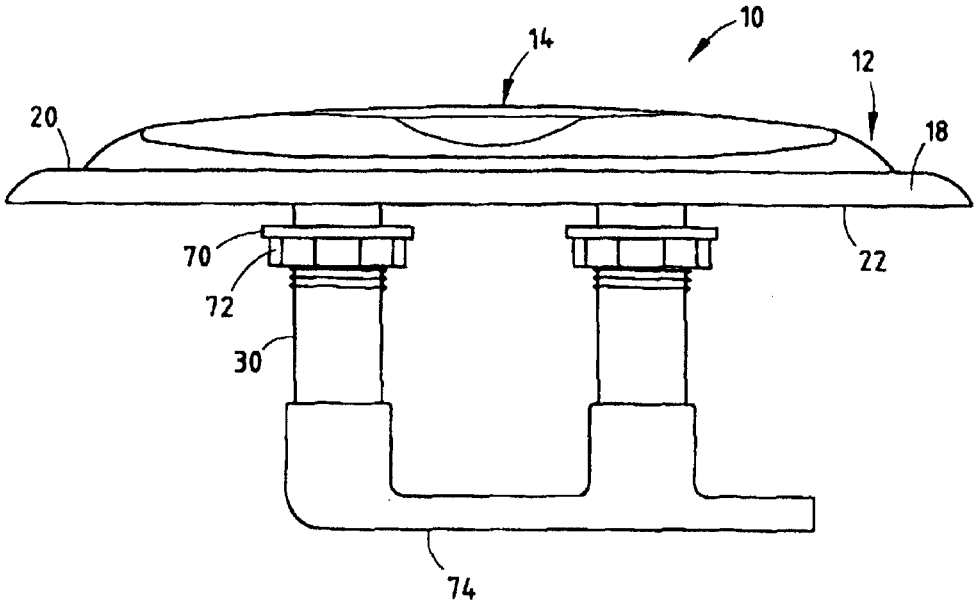
FIG. 1 is a side elevational view of a lift-up cleat assembly embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
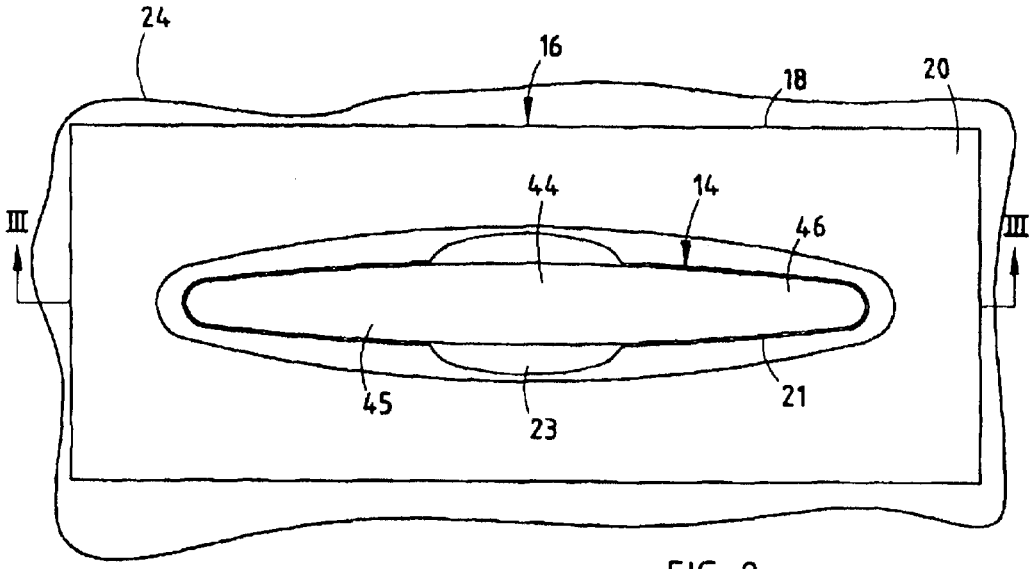
FIG. 2 is a top plan view of a the cleat assembly.
Figure 3:
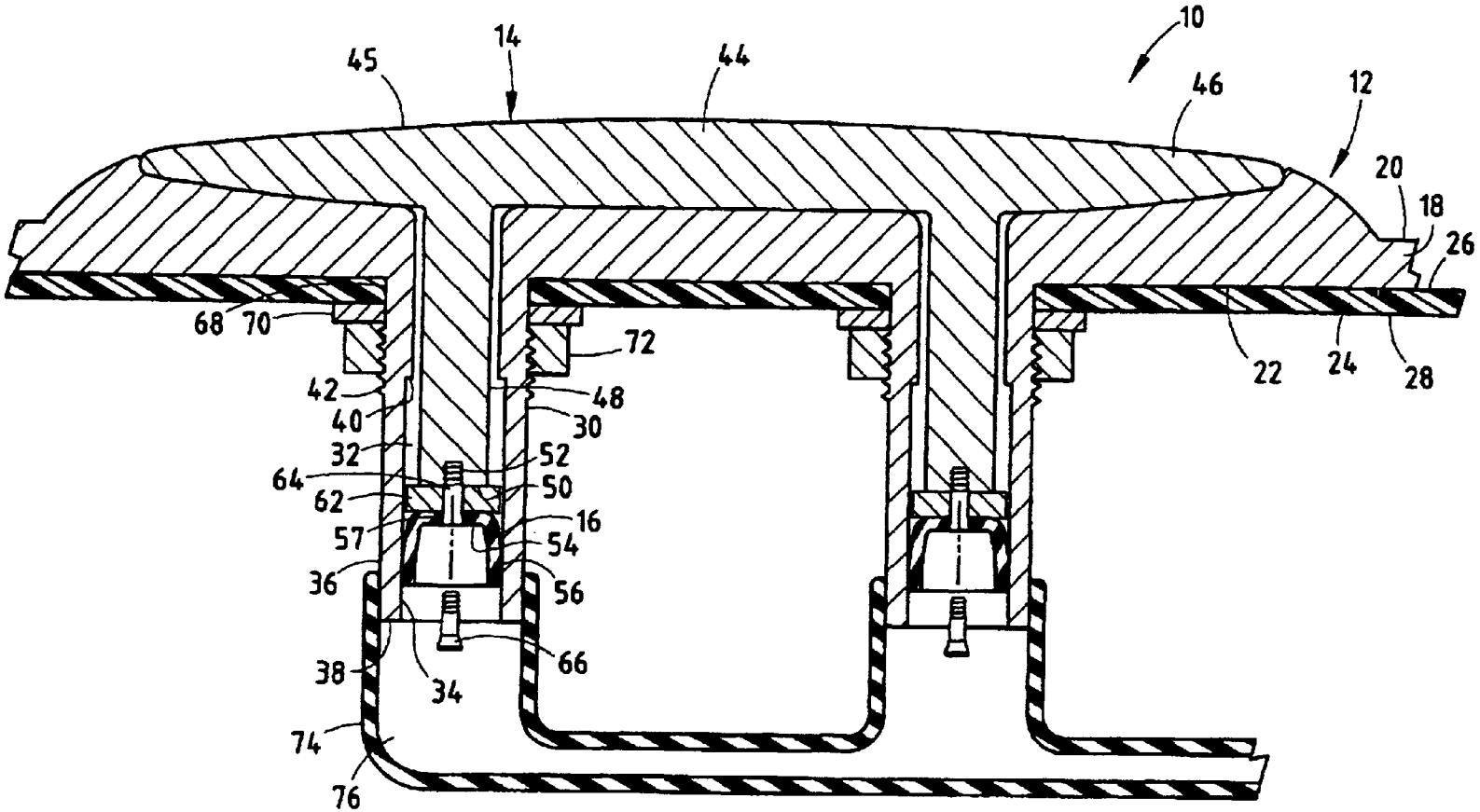
FIG. 3 is a cross-sectional side view of the cleat assembly, taken along the line III—III, FIG. 2, wherein a cleat member is shown in a fully retracted position.
Figure 4:
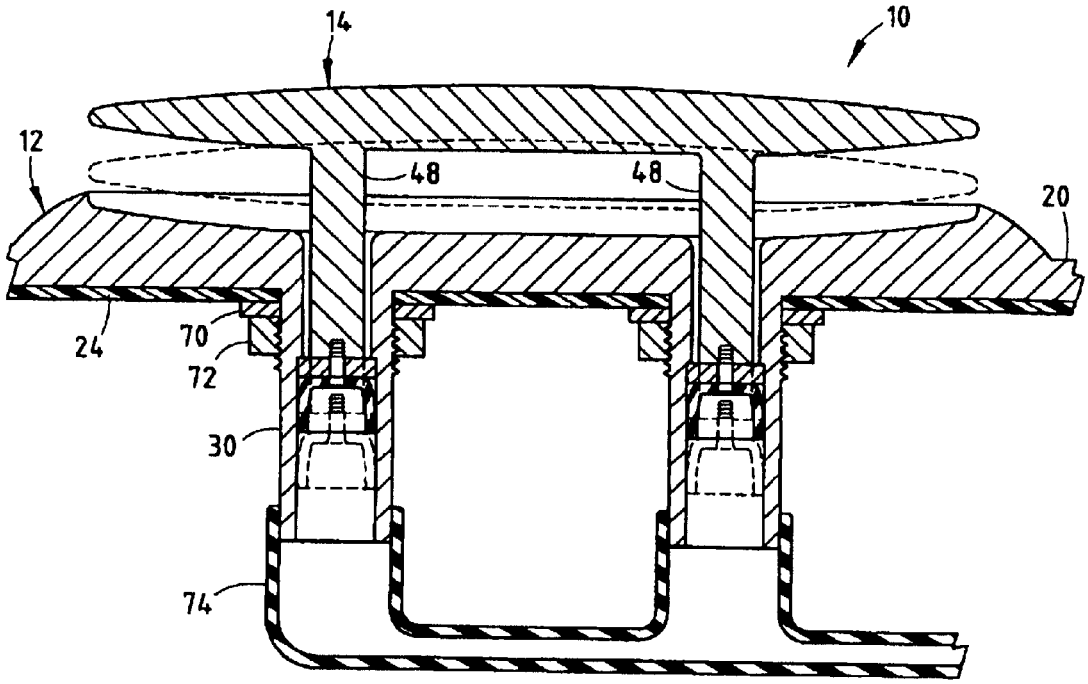
FIG. 4 is a cross-sectional side view of the cleat assembly taken along the line III—III, FIG. 2, wherein the cleat member is shown in a fully extended position in solid and an intermediate position in phantom.

The reference numeral 10 (FIGS. 1 and 2) generally designates a lift-up retractable cleat assembly embodying the present invention. Cleat assembly 10 includes a base member 12, a retractable cleat member 14, and at least one cup-shaped retainer 16 (FIG. 3). The retractable cleat member 14 is operable within base member 12 between a fully retracted or storage position, as shown in FIG. 3, a fully extended or in-use position, as shown in FIG. 4, and a plurality of infinitesimally small increments between the fully retracted and fully extended positions, as shown in FIG. 4 in phantom.

The illustrated base member 12 is constructed of steel, aluminum or other suitable material, and includes an upper plate 18 having a top surface 20 and a bottom surface 22, and is shaped to be mounted on an associated boat surface 24 having a top surface 26 and a bottom surface 28. Upper plate 18 has a generally rectangular shape, however, it is foreseeable that various alternative shapes may be used. Base member 12 also includes a pair of centrally disposed, vertically oriented tubes 30 that depend from upper plate 18. Each tube 30 has a hollow interior 32 defined by an interior wall 34 and an exterior wall 36 and has a generally cylindrical shape, with a lower or distal end 38. Each interior wall 34 is provided with a radially inwardly extending step wall 40 located therealong. Exterior wall 36 is provided with a plurality of threads 42 along a portion of the length thereof.

Retractable cleat member 14 includes an upper cleat-shaped head 44 having outwardly disposed flanged ends 46 and a top surface 45. Head 44 has a generally oval shape, however, it is foreseeable that alternative shapes may be used. The flanged ends 46 of cleat head 44 extend sufficiently outward, so as to allow mooring or retention lines associated with various objects within the boat or casting lines from a dock to be secured thereon. Retractable cleat member 14 also includes a pair of centrally disposed, vertically oriented mounting posts 48 that depend downwardly from cleat head 44. The illustrated posts 40 are generally cylindrical in shape, and have a lower or distal end 50. A threaded aperture is centrally located within end 50 of each post 48 and extends longitudinally therealong.

Figure 5:
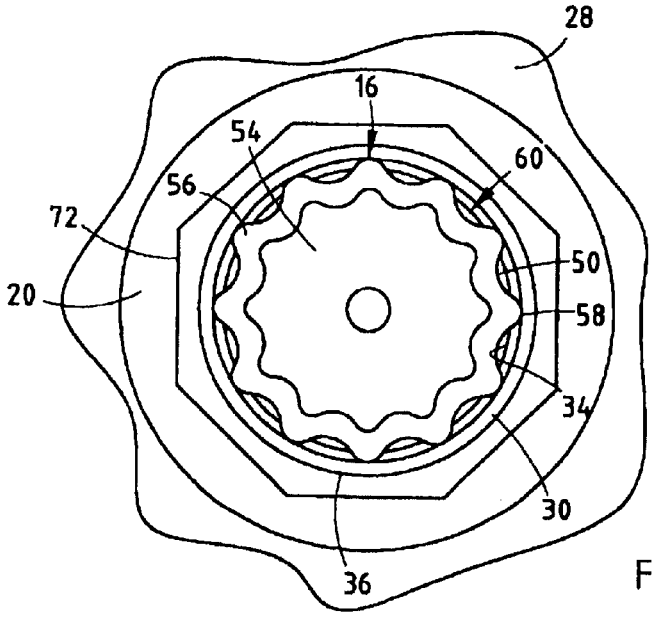
FIG. 5 is a fragmentary bottom plan view of the cleat assembly.

A cup-shaped retainer 16 is located within hollow interior 32 of each tube 30 of base member 12. Each retainer 16 is preferably constructed of a flexible resilient material, such as polypropylene, rubber, synthetic resins, etc. Each retainer 16 includes a central portion 54 and an elastically deformable skirt portion 56 that flexibly abuts interior wall 34 of tube 30, thereby providing infinitesimally small increments of adjustability of each post 48 within the associated tube 30 and, as a result, infinitesimally small increments of adjustability of cleat member 14 with respect to base member 12. An aperture 55 extends through central portion 54 of each retainer 16. Skirt portion 56 (FIG. 5) of each retainer 16 has a pleated overall shape thereby creating contact points between retainer 16 and interior wall 34 of tube 30 and a plurality of voids or gaps 60 between retainer 16 and interior wall 34 of tube 30 interspaced with contact points 58.

In assembly, a circularly shaped spacer/stop member 62 having a centrally located aperture 64 is located between central portion 54 of each retainer 16 and end 50 of each post 48. Mounting hardware such as a machine screw 66 extends through aperture 55 of each retainer 16 and aperture 64 of each stop member 62, and is threadably received within threaded aperture 52 within each post 48, thereby affixing retainer 16 and stop member 62 to end 50 of each post 48.

In the illustrated example, tubes 30, mounting posts 48 and retainers 16 all have a generally circular cross-sectional shape. However, it is to be understood that other cross-sectional shapes could be used to form tubes 30 and posts 48, and that the cross-sectional shape of the retainers 16 could be configured similarly, so long as the retainers 16 flexibly abut interior surfaces 34 of tubes 30, thereby providing infinitesimally small adjustability of cleat member 14 with respect to base member 12, and are configured so as to allow fluids collected within recess 21 and tubes 30 to flow past retainers 16. Further, it should be noted that interior surface 34 of each tube 30 may be provided with a rough outer finish, thereby increasing the frictional coefficient between each retainer 16 and tube 30 and creating a more positive engagement therebetween.

The base member 12 is further provided with a cleat head recess 21 and finger recesses 23. Cleat head recess 21 is generally oval-shaped and is configured so as to allow cleat head 44 of cleat member 14 to be received and seat therein, such that the top surface 45 of cleat head 44 is substantially flush with top surface 20 of upper plate 18 of base member 12 when cleat member 14 is in the fully retracted position. Finger recesses 23 extend outwardly from cleat head recess 21 within upper plate 18, and are sufficiently large enough for the operator of cleat assembly 10 to insert their fingers within the finger recess 23, thus grasping the sides of cleat head 44 and allowing the operator to raise retractable cleat member 14 from the lowered position to a fully extended position, or to any intermediate position between the fully retracted position and the fully extended position.

The cleat assembly 10 is mounted on boat surface 24 by forming a pair of circularly shaped apertures 68 within boat surface 24 sized to allow the placement of tubes 30 of base member 12 therethrough. When mounted, bottom surface 22 of upper plate of base member 12 mounts flush with top surface 26 of boat surface 24. A flat washer 70 is placed over each tubes 30 and abuts bottom surface 28 of boat surface 24. A nut 72 is threadably received about each tube 30 via threads 42 and abuts each washer 70, thereby mounting cleat assembly 10 onto boat surface 24.

In operation, water that enters interior 32 of each tube 30 is allowed to drain past retainers 16 via voids 60 located between skirt portion 56 of each retainer 16 and interior wall 34 of each tube 30, and exit end 38 of each tube 30. A boot 74, constructed of a flexibly resilient material such as rubber, encases end 38 of each tube 30, and guides the water away from cleat assembly 10 via interior passage 76.

Figure 6:
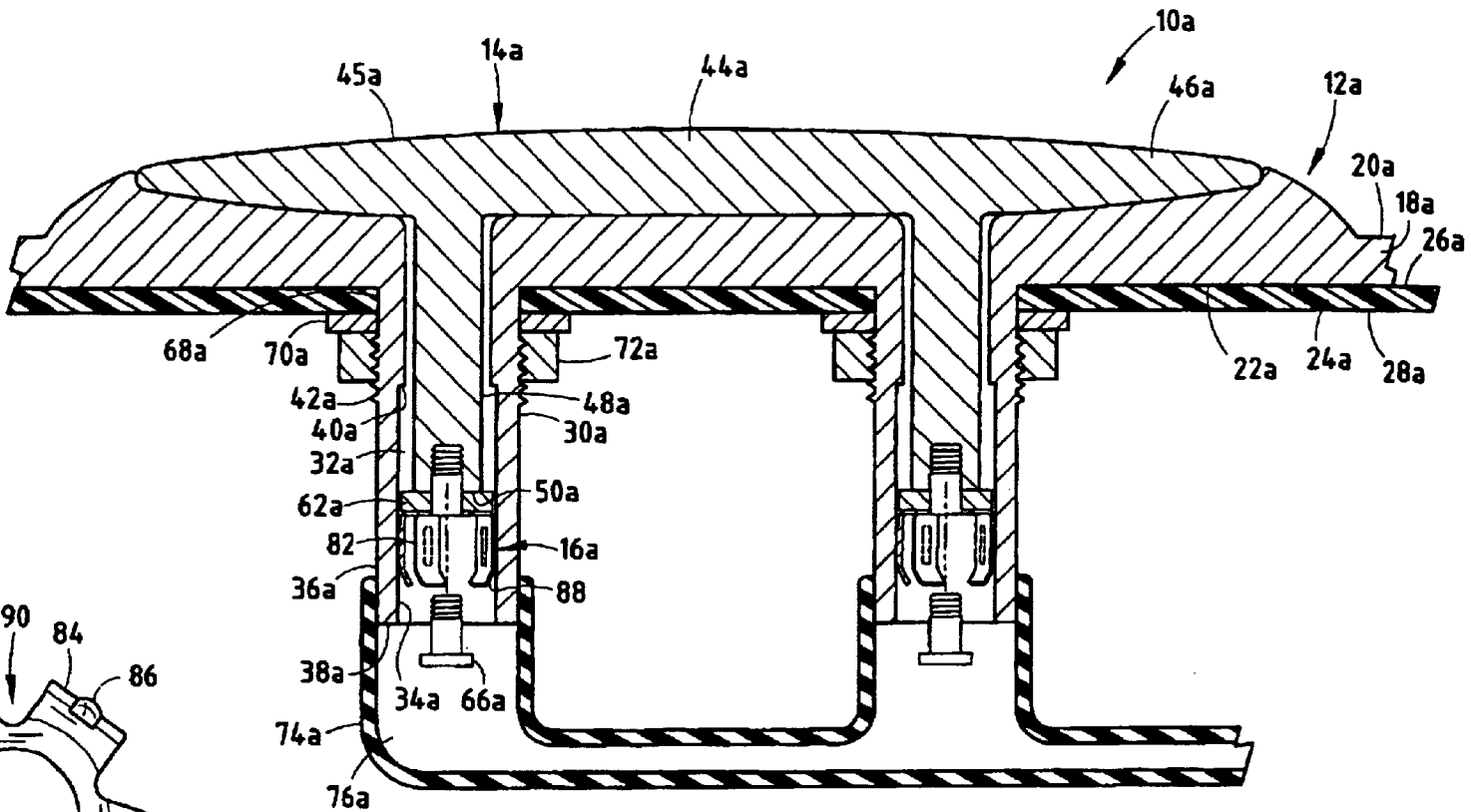
FIG. 6 is a cross-sectional side view of an alternative embodiment of the cleat assembly.
Figure 7:
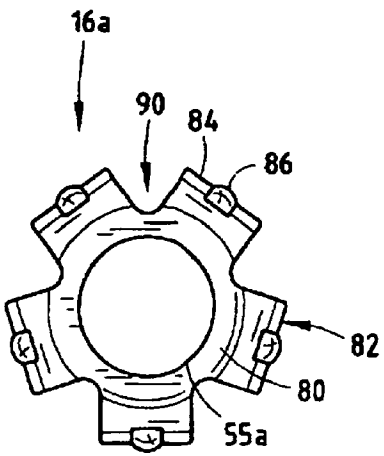
FIG. 7 is a top plan view of a retainer of the alternative embodiment of the cleat assembly.

The reference numeral 10a (FIG. 6) generally designates another embodiment of the cleat assembly. Since cleat assembly 10a is similar to cleat assembly 10, similar parts appearing in FIG. 3 and FIG. 6 respectively are represented by the same corresponding reference numeral, except for the suffix "a" in the numeral of the latter. In the illustrated example, cleat assembly 10a includes a cup-shaped retainer 16a that is located within hollow interior 32a of each tube 30a of base member 12a. Each retainer 16a is preferably constructed of a flexible resilient metal, such as steel, however, other suitable materials may be utilized. Each retainer 16a (FIG. 7) includes a central portion 80 and a plurality of elastically deformable fingers 82 extending downwardly from central portion 80 and that flexibly abut interior wall 34a of tube 30a, thereby providing infinitesimally small increments of adjustability of each post 48a within the associated tube 30a, and as a result, infinitesimally small increments of adjustability of cleat member 14a with respect to base member 12a. Specifically, each finger 82 includes a planar section 84 from which an oval-shaped dimple 86 extends outwardly therefrom. Each finger 82 is configured such that dimple 86 contacts interior wall 34a of tube 30a during operation of cleat assembly 10a. Each finger 82 also includes an inwardly curved end 88 that provides clearance between interior wall 34a of tube 30a and end 88 of each finger 82. Fingers 82 of each retainer 16a are spaced about the periphery of central portion 80, thereby providing a plurality of voids or gaps 90 between retainer 16a and interior wall 34a of tube 30a. An aperture 55a extends through central portion 80 of each retainer 16a. A mechanical fastener 66a, such as a bolt, fastens the retainer 16a to posts 48a. In operation, water that enters interior 32a of each tube 30a is allowed to drain past retainers 16a via voids 90 located between dimples 86 of each finger 82 of each retainer 16a and interior wall 34a of each tube 30a, and exit end 38a of each tube 30a.

The present inventive lift-up cleat assemblies 10 and 10a provide infinitesimally small increments of adjustability of the retractable cleat member within the base member, thereby allowing for precise adjustment of the cleat member depending on the required use, such as the size of the mooring lines utilized, etc. The shape of the retainers allow for complete drainage of the interior of each tube of the base member, thereby reducing the possible corrosion, discoloration and blemishing of the base member, the retractable cleat and other components of retractable cleat assemblies 10 and 10a that may hinder operation thereof. Further, the one-piece base member and the mounting arrangement thereof reduces the corrosion associated with multiple piece base members, as well as reduces the deterioration of the mounting surface such as a boat deck normally associated with mounting a cleat assembly to a deck surface via hardware such as screws that extend into the boat deck surface.

The above description is considered that of the preferred embodiments only. Modifications of the invention will occur to those skilled in the art and to those who use the invention. Therefore, it is understood that the embodiments shown in the drawings and described above are merely for illustrative purposes and not intended to limit the scope of the invention, which is defined by the following claims as interpreted according to the principals of patent law, including the Doctrine of Equivalents.

The invention claimed is:

1. A lift-up cleat assembly, comprising:

a base member having an upper plate shaped to abut a mounting surface and at least one normally vertically oriented tube depending from the plate, the tube having a hollow interior;

a retractable cleat member having an upper cleat-shaped head shaped to retain lines thereon, and at least one normally vertically oriented mounting post depending from the head, wherein the post is telescopingly received in the interior of the tube of the base member and is telescopingly movable along a given length of travel; and a cup-shaped retainer located within the hollow interior of the tube of the base member and having a central portion fixed with respect to the mounting post of the cleat member and an elastically deformable skirt portion that flexibly abuts the tube of the base member, thereby providing infinitesimally small increments of adjustability of the post of the cleat member within the tube of the base member along the length of travel, and wherein the retainer is shaped to allow liquid located within the interior of the tube of the base member to drain therefrom.

2. The cleat assembly of claim 1, wherein the skirt portion of the retainer includes a pleated section, thereby providing at least one void between the skirt portion of the retainer and the tube of the base member.

3. The cleat assembly of claim 2, wherein the skirt portion of the retainer extends downwardly from the central portion of the cleat member.

4. The cleat assembly of claim 3, further including:

a substantially rigid spacer located between the central portion of the retainer and an end of the mounting post of the cleat member, wherein the spacer abuts a step wall of the interior tube, thereby limiting the travel of the post within the tube.

5. The cleat assembly of claim 4, wherein the interior of the tube of the base member is provided with a rough interior surface.

6. The cleat assembly of claim 5, wherein the retainer is constructed of a polypropylene material.

7. The cleat assembly of claim 4, further including:

a boot surrounding an open end of the tube of the base member and adapted to collect and guide liquid traveling through the open end of the base member away from the base member.

8. The cleat assembly of claim 7, wherein the at least one tube of the base member includes a pair of tubes juxtaposed across a substantially central point of the base member, and wherein the at least one mounting post includes a pair of mounting posts juxtaposed across a substantially central point of the cleat member.

9. The cleat member of claim 8, wherein the base member is shaped to mount flush with the mounting surface.

10. The cleat member of claim 9, wherein the base member includes a recess extending into an upper surface thereof, and wherein the recess receives the head of the cleat member such that an upper surface of the head is flush with the upper surface of the base member.

11. The cleat assembly of claim 1, wherein the skirt portion is divided into a plurality of fingers.

12. The cleat assembly of claim 11, wherein the fingers extend downwardly from the central portion of the cleat member.

13. The cleat assembly of claim 12, wherein each finger includes a radially outwardly extending dimple, and wherein each dimple abuts the tube.

14. The cleat assembly of claim 13, wherein each finger includes an end that bends radially inward.

15. The cleat assembly of claim 11, wherein each finger includes a radially outwardly extending dimple, and wherein each dimple abuts the tube.

16. The cleat assembly of claim 11, wherein each finger includes an end that bends radially inward.

17. The cleat assembly of claim 1, wherein the skirt portion of the retainer extends downwardly from the central portion of the cleat member.

18. The cleat assembly of claim 1, further including:

a substantially rigid spacer located between the central portion of the retainer and an end of the mounting post of the cleat member, wherein the spacer abuts a step wall of the interior of the tube, thereby limiting the travel of the post within the tube.

19. The cleat assembly of claim 1, wherein the interior of the tube of the base member is provided with a rough interior surface.

20. The cleat assembly of claim 1, wherein the retainer is constructed of a polypropylene material.

21. The cleat assembly of claim 1, further including:

a boot surrounding an open end of the tube of the base member and adapted to collect and guide liquid traveling through the open end of the base member away from the base member.

22. The cleat assembly of claim 1, wherein the at least one tube of the base member includes a pair of tubes juxtaposed across a substantially central point of the base member, and wherein the at least one mounting post includes a pair of mounting posts juxtaposed across a substantially central point of the cleat member.

23. The cleat member of claim 1, wherein the base member is shaped to mount flush with the mounting surface.

24. The cleat member of claim 23, wherein the base member includes a recess extending into an upper surface thereof, and wherein the recess receives the head of the cleat member such that an upper surface of the head is flush with the upper surface of the base member.

25. A lift-up cleat assembly, comprising:

a one-piece base member having an upper plate defined by a top surface and a bottom surface, the base member shaped such that the bottom surface of the base member is adapted to flushly abut a mounting surface, the base member also including and at least one normally vertically oriented tube depending from the plate, the tube having a hollow interior, the base member further including a recess extending into the top surface;

a retractable cleat member having an upper cleat-shaped head shaped to retain lines thereon, and at least one normally vertically oriented mounting post depending from the head, the post telescopingly received in the interior of the tube of the base member, the head including an upper surface that is substantially flush with the upper surface of the base member when the cleat member is in a retracted position; and a fastener coupled with the tube of the base member and adapted to abut a bottom surface of the mounting surface, thereby retaining the base member to the mounting surface.

26. The cleat assembly of claim 25, wherein the tube has a threaded outer surface, and wherein the fastener includes a nut that is threadably received on the outer surface of the tube.

27. The cleat assembly of claim 26, wherein the fastener includes a washer received about the tube of the base member, the washer abutted by the nut and adapted to abut the lower surface of the mounting surface when the base member is retained to the mounting surface.

28. The cleat assembly of claim 25, further including:

a cup-shaped retainer located within the hollow interior of the tube of the base member and having a central portion fixed with respect to the mounting post of the cleat member and an elastically deformable skirt portion that flexibly abuts the tube of the base member, thereby providing infinitesimally small increments of adjustability of the post of the cleat member within the tube of the base member along the length of travel.

29. The cleat assembly of claim 28, wherein the retainer is shaped to allow liquid located within the interior of the tube of the base member to drain therefrom.

30. The cleat assembly of claim 29, wherein the skirt portion of the retainer includes a pleated section, thereby providing at least one void between the skirt portion of the retainer and the tube of the base member.

31. The cleat assembly of claim 29, further including:

a boot surrounding an open end of the tube of the base member and adapted to collect and guide liquid traveling through the open end of the base member away from the base member.

32. The cleat assembly of claim 28, wherein the skirt portion of the retainer extends downwardly from the central portion of the cleat member.

33. The cleat assembly of claim 28, further including:

a substantially rigid spacer located between the central portion of the retainer and an end of the mounting post of the cleat member, wherein the spacer abuts a step wall of the interior of the tube, thereby limiting the travel of the post within the tube.

34. The cleat assembly of claim 28, wherein the interior of the tube of the base member is provided with a rough interior surface.

35. The cleat assembly of claim 28, wherein the retainer is constructed of a polypropylene material.

36. The cleat assembly of claim 28, wherein the at least one tube of the base member includes a pair of tubes juxtaposed across a substantially central point of the base member, and wherein the at least one mounting post includes a pair of mounting posts juxtaposed across a substantially central point of the cleat member.

37. The cleat assembly of claim 28, wherein the skirt portion is divided into a plurality of fingers.

38. The cleat assembly of claim 37, wherein the fingers extend downwardly from the central portion of the cleat member.

39. The cleat assembly of claim 38, wherein each finger includes a radially outwardly extending dimple, and wherein each dimple abuts the tube.

40. The cleat assembly of claim 39, wherein each finger includes an end that bends radially inward.

41. The cleat assembly of claim 28, wherein each finger includes a radially outwardly extending dimple, and wherein each dimple abuts the tube.

42. The cleat assembly of claim 28, wherein each finger includes an end that bends radially inward.

*43. A lift-up cleat assembly, comprising:*

*a base member having an upper plate shaped to abut a mounting surface and at least one normally vertically oriented tube, the tube having a hollow interior;*

*a retractable cleat member having an upper cleat-shaped head shaped to retain lines thereon, and at least one normally vertically oriented mounting post depending from the head, wherein the post is telescopingly received in the interior of the tube of the base member and is telescopingly movable along a given length of travel; and*

*a retainer configured to provide infinitesimally small increments of adjustability of the post of the cleat member, wherein the retainer is shaped to allow liquid to drain.*

*44. The cleat assembly of claim 43, wherein the retainer is located within the hollow interior of the tube of the base member and is fixed with respect to the mounting post of the cleat member, wherein the retainer provides infinitesimally small increments of adjustability of the post of the cleat member within the tube of the base member along the length of travel, and wherein the retainer is shaped to allow liquid located within the interior of the tube of the base member to drain therefrom.*

*45. The cleat assembly of claim 43, wherein the retainer comprises a plurality of first portions in contact with the tube and a plurality of second portions not in contact with the tube and interspaced with the plurality of first portions, whereby the plurality of first portions in contact with the tube provide infinitesimally small increments of adjustability of the post of the cleat member within the tube of the base member along the length of travel, and whereby the plurality of second portions not in contact with the tube allow liquid located within the interior of the tube of the base member to drain therefrom.*

*46. The cleat assembly of claim 43, wherein the retainer comprises a cup-shaped retainer located within the hollow interior of the tube of the base member and having a central portion fixed with respect to the mounting post of the cleat member and an elastically deformable skirt portion that flexibly abuts the tube of the base member, thereby providing infinitesimally small increments of adjustability of the post of the cleat member within the tube of the base member along the length of travel, and wherein the retainer is shaped to allow liquid located within the interior of the tube of the base member to drain therefrom.*

*47. The cleat assembly of claim 46, wherein the skirt portion of the retainer includes a pleated section, thereby providing at least one void between the skirt portion of the retainer and the tube of the base member.*

*48. The cleat assembly of claim 47, wherein the skirt portion of the retainer extends downwardly from the central portion of the cleat member.*

*49. The cleat assembly of claim 48, further including:*

*a substantially rigid spacer located between the central portion of the retainer and an end of the mounting post of the cleat member, wherein the spacer abuts a step wall of the interior tube, thereby limiting the travel of the post within the tube.*

*50. The cleat assembly of claim 49, wherein the interior of the tube of the base member is provided with a rough interior surface.*

*51. The cleat assembly of claim 50, wherein the retainer is constructed of a polypropylene material.*

*52. The cleat assembly of claim 49, further including:*

*a boot surrounding an open end of the tube of the base member and adapted to collect and guide liquid traveling through the open end of the base member away from the base member.*

*53. The cleat assembly of claim 52, wherein the at least one tube of the base member includes a pair of tubes juxtaposed across a substantially central point of the base member, and wherein the at least one mounting post includes a pair of mounting posts juxtaposed across a substantially central point of the cleat member.*

*54. The cleat member of claim 53, wherein the base member is shaped to mount flush with the mounting surface.*

*55. The cleat member of claim 54, wherein the base member includes a recess extending into an upper surface thereof, and wherein the recess receives the head of the cleat member such that an upper surface of the head is flush with the upper surface of the base member.*

*56. The cleat assembly of claim 46, wherein the skirt portion is divided into a plurality of fingers.*

*57. The cleat assembly of claim 56, wherein the fingers extend downwardly from the central portion of the cleat member.*

*58. The cleat assembly of claim 57, wherein each finger includes a radially outwardly extending dimple, and wherein each dimple abuts the tube.*

*59. The cleat assembly of claim 58, wherein each finger includes an end that bends radially inward.*

*60. The cleat assembly of claim 56, wherein each finger includes a radially outwardly extending dimple, and wherein each dimple abuts the tube.*

*61. The cleat assembly of claim 56, wherein each finger includes an end that bends radially inward.*

*62. The cleat assembly of claim 46, wherein the skirt portion of the retainer extends downwardly from the central portion of the cleat member.*

*63. The cleat assembly of claim 46, further including:*

*a substantially rigid spacer located between the central portion of the retainer and an end of the mounting post of the cleat member, wherein the spacer abuts a step wall of the interior of the tube, thereby limiting the travel of the post within the tube.*

*64. The cleat assembly of claim 46, wherein the interior of the tube of the base member is provided with a rough interior surface.*

*65. The cleat assembly of claim 46, wherein the retainer is constructed of a polypropylene material.*

*66. The cleat assembly of claim 46, further including:*

*a boot surrounding an open end of the tube of the base member and adapted to collect and guide liquid traveling through the open end of the base member away from the base member.*

*67. The cleat assembly of claim 46, wherein the at least one tube of the base member includes a pair of tubes juxtaposed across a substantially central point of the base member, and wherein the at least one mounting post includes a pair of mounting posts juxtaposed across a substantially central point of the cleat member.*

*68. The cleat member of claim 46, wherein the base member is shaped to mount flush with the mounting surface.*

*69. The cleat member of claim 68, wherein the base member includes a recess extending into an upper surface thereof, and wherein the recess receives the head of the cleat member such that an upper surface of the head is flush with the upper surface of the base member.*

*70. A lift-up cleat assembly, comprising:*

*a base member having an upper plate shaped to abut a mounting surface and at least one normally vertically oriented tube, the tube having a hollow interior;*

*a retractable cleat member having an upper cleat-shaped head shaped to retain lines thereon, and at least one normally vertically oriented mounting post depending from the head, wherein the post is telescopingly received in the interior of the tube of the base member and is telescopingly movable along a given length of travel; and*

*a retainer located within the hollow interior of the tube of the base member and fixed with respect to the mounting post of the cleat member, the retainer comprising a plurality of first portions in contact with the tube and a plurality of second portions not in contact with the tube and interspaced with the plurality of first portions, wherein the plurality of first portions in contact with the tube provide infinitesimally small increments of adjustability of the post of the cleat member within the tube of the base member along the length of travel, and wherein the plurality of second portions not in contact with the tube allow liquid located within the interior of the tube of the base member to drain therefrom.*

*71. The cleat assembly of claim 70, wherein the retainer comprises a cup-shaped retainer located within the hollow interior of the tube of the base member and having a central portion fixed with respect to the mounting post of the cleat member and an elastically deformable skirt portion that flexibly abuts the tube of the base member, thereby providing infinitesimally small increments of adjustability of the post of the cleat member within the tube of the base member along the length of travel, and wherein the retainer is shaped to allow liquid located within the interior of the tube of the base member to drain therefrom.*

*72. The cleat assembly of claim 71, wherein the skirt portion of the retainer includes a pleated section, thereby providing at least one void between the skirt portion of the retainer and the tube of the base member.*

*73. The cleat assembly of claim 72, wherein the skirt portion of the retainer extends downwardly from the central portion of the cleat member.*

*74. The cleat assembly of claim 73, further including:*

*a substantially rigid spacer located between the central portion of the retainer and an end of the mounting post of the cleat member, wherein the spacer abuts a step wall of the interior tube, thereby limiting the travel of the post within the tube.*

*75. The cleat assembly of claim 74, wherein the interior of the tube of the base member is provided with a rough interior surface.*

*76. The cleat assembly of claim 75, wherein the retainer is constructed of a polypropylene material.*

*77. The cleat assembly of claim 74, further including:*

*a boot surrounding an open end of the tube of the base member and adapted to collect and guide liquid traveling through the open end of the base member away from the base member.*

*78. The cleat assembly of claim 77, wherein the at least one tube of the base member includes a pair of tubes juxtaposed across a substantially central point of the base member, and wherein the at least one mounting post includes a pair of mounting posts juxtaposed across a substantially central point of the cleat member.*

*79. The cleat member of claim 78, wherein the base member is shaped to mount flush with the mounting surface.*

*80. The cleat member of claim 79, wherein the base member includes a recess extending into an upper surface thereof, and wherein the recess receives the head of the cleat member such that an upper surface of the head is flush with the upper surface of the base member.*

*81. The cleat assembly of claim 71, wherein the skirt portion is divided into a plurality of fingers.*

*82. The cleat assembly of claim 81, wherein the fingers extend downwardly from the central portion of the cleat member.*

*83. The cleat assembly of claim 82, wherein each finger includes a radially outwardly extending dimple, and wherein each dimple abuts the tube.*

*84. The cleat assembly of claim 83, wherein each finger includes an end that bends radially inward.*

*85. The cleat assembly of claim 81, wherein each finger includes a radially outwardly extending dimple, and wherein each dimple abuts the tube.*

*86. The cleat assembly of claim 81, wherein each finger includes an end that bends radially inward.*

*87. The cleat assembly of claim 71, wherein the skirt portion of the retainer extends downwardly from the central portion of the cleat member.*

*88. The cleat assembly of claim 71, further including:*

*a substantially rigid spacer located between the central portion of the retainer and an end of the mounting post of the cleat member, wherein the spacer abuts a step wall of the interior of the tube, thereby limiting the travel of the post within the tube.*

*89. The cleat assembly of claim 71, wherein the interior of the tube of the base member is provided with a rough interior surface.*

*90. The cleat assembly of claim 71, wherein the retainer is constructed of a polypropylene material.*

*91. The cleat assembly of claim 71, further including:*

*a boot surrounding an open end of the tube of the base member and adapted to collect and guide liquid traveling through the open end of the base member away from the base member.*

*92. The cleat assembly of claim 71, wherein the at least one tube of the base member includes a pair of tubes juxtaposed across a substantially central point of the base member, and wherein the at least one mounting post includes a pair of mounting posts juxtaposed across a substantially central point of the cleat member.*

*93. The cleat member of claim 71, wherein the base member is shaped to mount flush with the mounting surface.*

*94. The cleat member of claim 93, wherein the base member includes a recess extending into an upper surface thereof, and wherein the recess receives the head of the cleat member such that an upper surface of the head is flush with the upper surface of the base member.*

*95. A lift-up cleat assembly, comprising:*

*a base member having an upper plate defined by a top surface, the upper plate shaped to abut a portion of a mounting surface, the base member also including at least one normally vertically oriented tube, the tube having a hollow interior;*

*a retractable cleat member having an upper cleat-shaped head shaped to retain lines thereon, and at least one normally vertically oriented mounting post depending from the head, the post telescopingly received in the interior of the tube of the base member, the head including an upper surface that is substantially flush with a portion of the upper surface of the base member when the cleat member is in a retracted position, the head also including a lower surface that is above the mounting surface when the cleat member is in the retracted position; and*

*a fastener coupled with the tube of the base member and adapted to abut a bottom surface of the mounting surface, thereby retaining the base member to the mounting surface.*

*96. The cleat assembly of claim 95, wherein the tube has a threaded outer surface, and wherein the fastener includes a nut that is threadably received on the outer surface of the tube.*

*97. The cleat assembly of claim 96, wherein the fastener includes a washer received about the tube of the base member, the washer abutted by the nut and adapted to abut the lower surface of the mounting surface when the base member is retained to the mounting surface.*

*98. The cleat assembly of claim 95, further including:*

*a cup-shaped retainer located within the hollow interior of the tube of the base member and having a central portion fixed with respect to the mounting post of the cleat member and an elastically deformable skirt portion that flexibly abuts the tube of the base member, thereby providing infinitesimally small increments of adjustability of the post of the cleat member within the tube of the base member along the length of the travel.*

*99. The cleat assembly of claim 98, wherein the retainer is shaped to allow liquid located within the interior of the tube of the base member to drain therefrom.*

*100. The cleat assembly of claim 99, wherein the skirt portion of the retainer includes a pleated section, thereby providing at least one void between the skirt portion of the retainer and the tube of the base member.*

*101. The cleat assembly of claim 99, further including:*

*a boot surrounding an open end of the tube of the base member and adapted to collect and guide liquid traveling through the open end of the base member away from the base member.*

*102. The cleat assembly of claim 98, wherein the skirt portion of the retainer extends downwardly from the central portion of the cleat member.*

*103. The cleat assembly of claim 98, further including:*

*a substantially rigid spacer located between the central portion of the retainer and an end of the mounting post*

*of the cleat member, wherein the spacer abuts a step wall of the interior of the tube, thereby limiting the travel of the post within the tube.*

*104. The cleat assembly of claim 98, wherein the interior of the tube of the base member is provided with a rough interior surface.*

*105. The cleat assembly of claim 98, wherein the retainer is constructed of a polypropylene material.*

*106. The cleat assembly of claim 98, wherein the at least one tube of the base member includes a pair of tubes juxtaposed across a substantially central point of the base member, and wherein the at least one mounting post includes a pair of mounting posts juxtaposed across a substantially central point of the cleat member.*

*107. The cleat assembly of claim 98, wherein the skirt portion is divided into a plurality of fingers.*

*108. The cleat assembly of claim 107, wherein the fingers extend downwardly from the central portion of the cleat member.*

*109. The cleat assembly of claim 108, wherein each finger includes a radially outwardly extending dimple, and wherein each dimple abuts the tube.*

*110. The cleat assembly of claim 109, wherein each finger includes an end that bends radially inward.*

*111. The cleat assembly of claim 98, wherein each finger includes a radially outwardly extending dimple, and wherein each dimple abuts the tube.*

*112. The cleat assembly of claim 98, wherein each finger includes an end that bends radially inward.*

*113. A lift-up cleat assembly, comprising:*

*a base member having an upper plate defined by a top surface, the upper plate shaped to abut a portion of a mounting surface, the base member also including at least one normally vertically oriented tube, the tube having a hollow interior;*

*a retractable cleat member having an upper cleat-shaped head shaped to retain lines thereon, and at least one normally vertically oriented mounting post depending from the head, the post telescopingly received in the interior of the tube of the base member, the head including an upper surface that is substantially flush with a portion of the upper surface of the base member when the cleat member is in a retracted position, the head also including a lower surface that is above the mounting surface when the cleat member is in the retracted position; and*

*a fastener coupled with the tube of the base member and adapted to abut a bottom surface of the mounting surface, thereby retaining the base member to the mounting surface;*

*wherein the mounting post comprises a non-circular cross-sectional shape.*

*114. The cleat assembly of claim 113, wherein the tube has a threaded outer surface, and wherein the fastener includes a nut that is threadably received on the outer surface of the tube.*

*115. The cleat assembly of claim 113, further including:*

*a cup-shaped retainer located within the hollow interior of the tube of the base member and having a central portion fixed with respect to the mounting post of the cleat member and an elastically deformable skirt portion that flexibly abuts the tube of the base member, thereby providing infinitesimally small increments of adjustability of the post of the cleat member within the tube of the base member along the length of travel.*

* * * * *